United States Patent [19]

Lin

[11] Patent Number: 5,469,655

[45] Date of Patent: Nov. 28, 1995

[54] SOIL GUARD WALL ASSEMBLY

[76] Inventor: Chin T. Lin, No. 15-3, Pei Ping Yi St., Taichung, Taiwan

[21] Appl. No.: 394,599

[22] Filed: Feb. 27, 1995

[51] Int. Cl.⁶ .................................................. A01G 9/02
[52] U.S. Cl. ................................ 47/83; 52/561; 52/604; 47/82; 405/284
[58] Field of Search ........................ 47/82, 83; 52/561, 52/569, 604; 405/284, 286

[56] References Cited

U.S. PATENT DOCUMENTS 2,141,035  12/1938  Daniels ....................................... 52/604
4,524,551   6/1985  Scheiwiller ................................... 47/83
4,964,761  10/1990  Rossi ............................................ 47/83
5,108,231   4/1992  Rausch ......................................... 47/83
5,214,898   6/1993  Beretta ......................................... 47/82

Primary Examiner—Ramon S. Britts
Assistant Examiner—Joanne C. Downs

[57] ABSTRACT

A soil guard wall assembly includes a plurality of elongated soil guard wall modules each of which has a hexagonal configuration in section and is coupled together with each other so as to form the soil guard wall assembly with a honeycomb shape.

4 Claims, 4 Drawing Sheets

SOIL GUARD WALL ASSEMBLY

BACKGROUND OF THE INVENTION

1. Field of Invention

The present invention relates to a soil guard wall assembly, and more particularly to a soil guard wall assembly with a honeycomb shape.

2. Related Prior Art

A conventional soil guard wall assembly comprises a plurality of vertical wall plates surrounding an edge portion of a hillside etc., a plurality of reinforcing strips are fixedly and alternately attached to the wall plates and reinforcing concrete is supplied to stack upwardly along the vertical wall plates and enclosing the plurality of reinforcing strips so as to create a compact structure. By such an arrangement, the operational procedures for forming the soil guard wall assembly are complex and the soil guard wall assembly has a low capability of draining water, so easily restricting the flow of the water by soil or sands such that the water may be deposited heavily so as to form a flood to destroy the soil guard wall assembly. In addition, the conventional soil guard wall assembly is not able to enhance or even blend in with the environment, thereby easily causing great damage to the aesthetic quality of the mountain.

The present invention has arisen to mitigate and/or obviate the disadvantages of the conventional soil guard wall assembly.

SUMMARY OF THE INVENTION

The primary objective of the present invention is to provide a soil guard wall assembly with a honeycomb shape which is easily assembled with a compact structure.

In accordance with one aspect of the present invention, there is provided a soil guard wall assembly comprising a plurality of elongated soil guard wall modules each having a hexagonal configuration in section and coupled together with each other to form the soil guard wall assembly with a honeycomb shape. Each of the elongated soil guard wall modules includes two bottom corner portions. Two longitudinal grooves each are respectively defined in an underside of a corresponding one of the bottom corner portions of the elongated soil guard wall module. Two opposite wedged-shaped side portions each have a longitudinal post laterally protruding outwardly therefrom. A first side wall of a hexagonal configuration is formed on first ends of the two longitudinal posts and includes two top corner portions, two first depressions each are defined in an upperside of a corresponding one of the top corner portions of the first side wall, and an elongated slot is defined in the first side wall between the two top corner portions thereof. A second side wall of a hexagonal configuration is formed on the second ends of the two longitudinal posts and includes two top corner portions, two second depressions each are defined in an upperside of a corresponding one of the top corner portions of the second side wall and each align with a corresponding one of the first depressions, and a cavity is defined in the second side wall between the two top corner portions thereof. A concave opening facing upwardly is defined in the elongated soil guard wall module between the first and second side walls and communicates with the elongated slot and the cavity.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENTS

Figure 1:
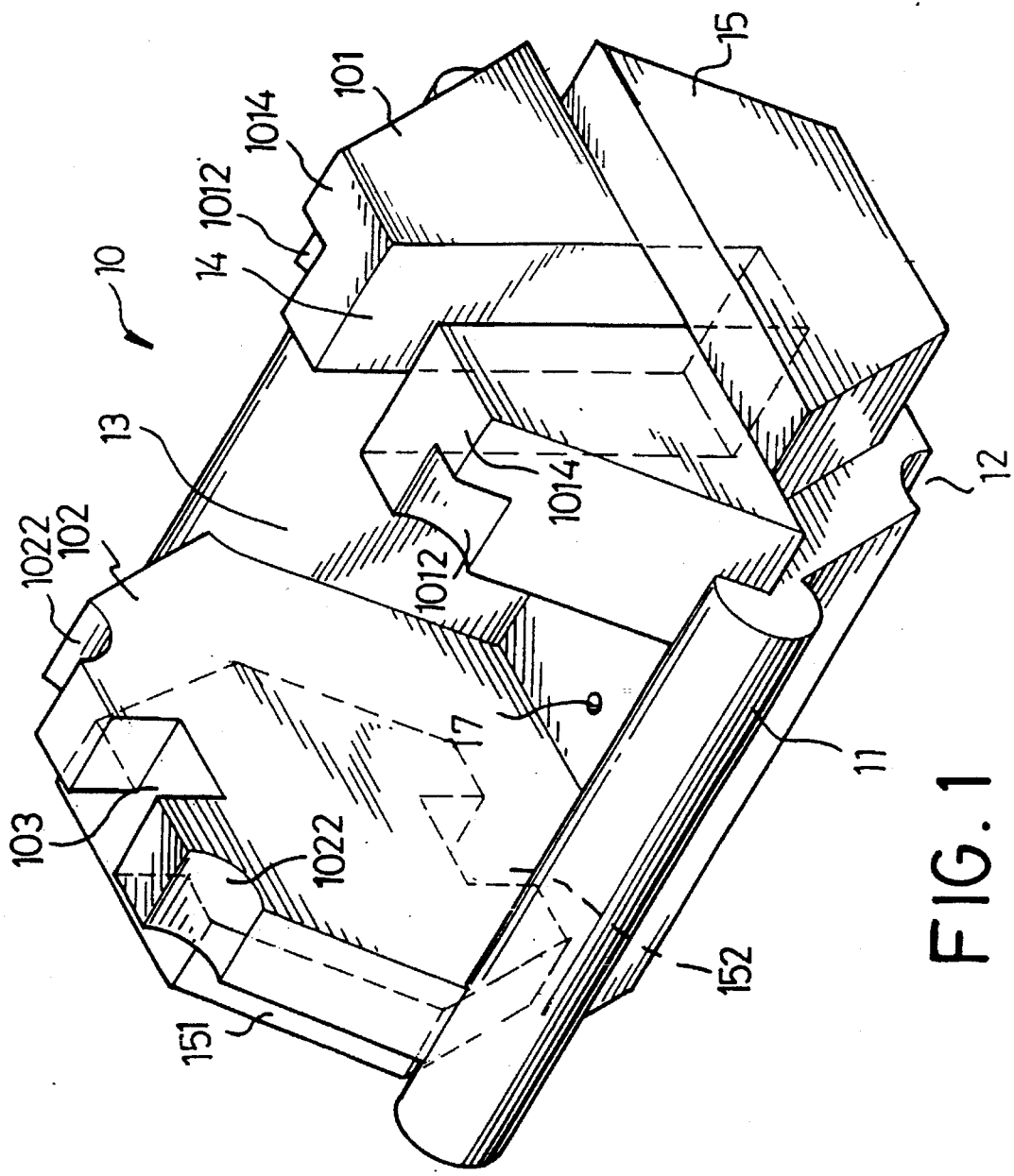
FIG. 1 is a perspective view of a soil guard wall module in accordance with the present invention.

Referring to the drawings and initially to FIG. 1, a soil guard assembly in accordance with the present invention comprises a plurality of elongated soil guard wall modules 10 each of which has a hexagonal configuration in section and is coupled together with each other so as to form the soil guard wall assembly 1 (see FIG. 3) with a honeycomb shape. The elongated soil guard wall modules 10 includes two bottom corner portions and two longitudinal arcuate grooves 12 which each are respectively defined in an underside of a corresponding one of the bottom corner portions of the elongated soil guard wall module 10. Two opposite wedged-shaped side portions each have a longitudinal post 11 laterally protruding outwardly therefrom, and each of the longitudinal posts 11 includes a first end and a second end.

A first side wall 101 of a hexagonal configuration is formed on the first ends of the two longitudinal posts 11 and includes two top corner portions, two first arcuate depressions 1012 each are defined in an upperside of a corresponding one of the top corner portions of the first side wall 101, and an elongated slot 14 is vertically defined in the first side wall 101 between the two top corner portions thereof. A second side wall 102 of a hexagonal configuration is formed on the second ends of the two longitudinal posts 11 and includes two top corner portions, two second arcuate depressions 1022 each are defined in an upperside of a corresponding one of the top corner portions of the second side wall 102 and each align with a corresponding one of the first arcuate depressions 1012, and a cavity 103 is defined in the second side wall 102 between the two top corner portions thereof. A concave opening 13 facing upwardly is defined in the elongated soil guard wall module 10 between the first and second side walls 101 and 102 and communicates with the elongated slot 14 and the cavity 103. It is to be noted that the cavity 103 is at a level higher than that of the elongated slot 14.

A first flange portion 15 laterally protrudes from the first side wall 101 and a second flange portion 151 laterally protrudes from the second side wall 102, and a cavity 152 is defined in an underside of the second flange portion 151. It is appreciated that the second flange portion 151 has a dimension smaller than that of the second side wall 102. A plurality of vertical holes 17 (only one hole is shown) each are defined in an underside of the elongated soil guard wall module 10 and each communicate with the concave opening 13. The first side wall 101 includes two projections 1014 each formed on a corresponding one of the top corner portions thereof and adjacent to the associated first depression 1012 therein.

Figure 2:
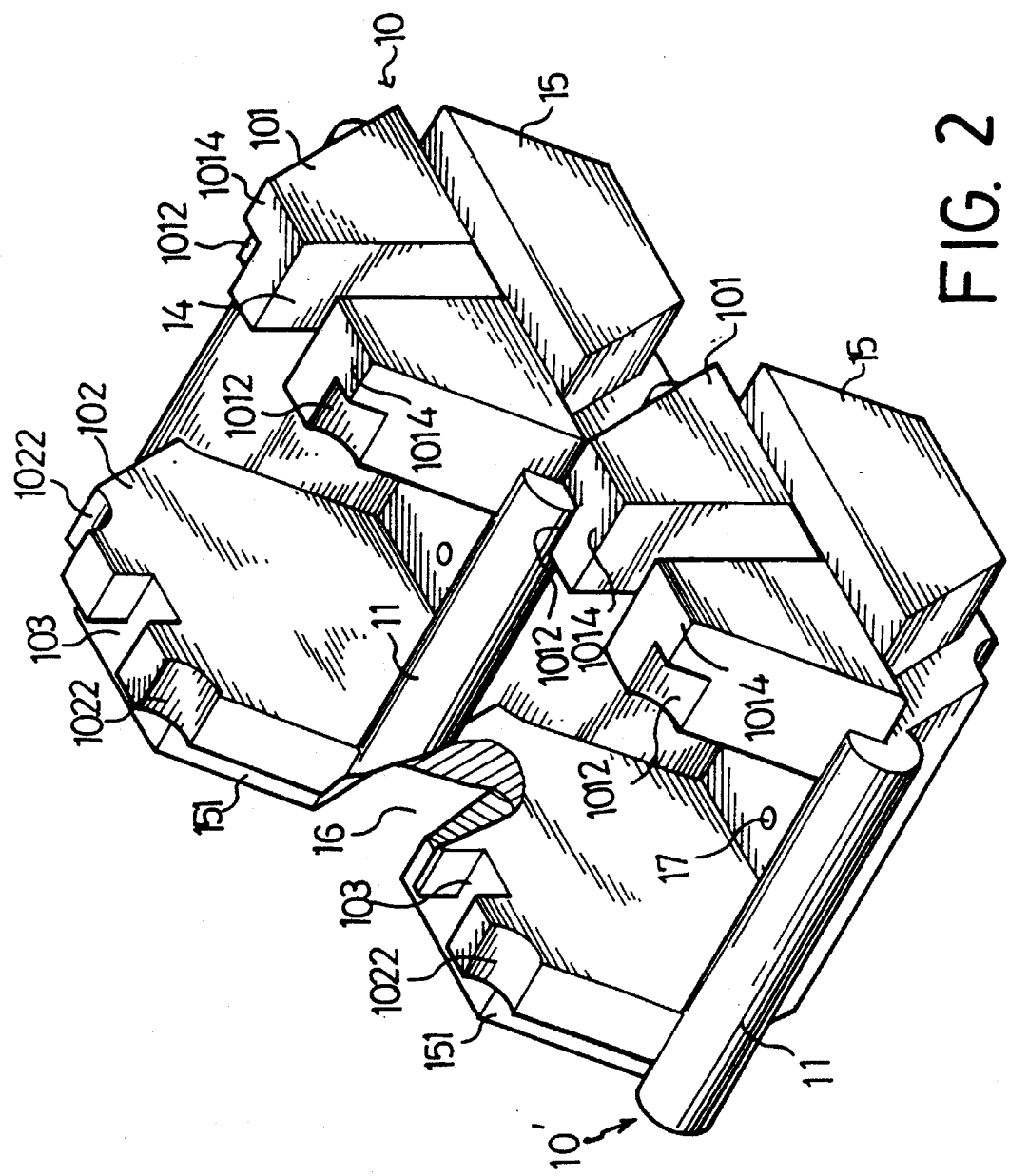
FIG. 2 is a partially cross-sectional assembly view of two soil guard wall modules as shown in FIG. 1.

In assembly, referring to FIG. 2, two soil guard wall modules are coupled together with an elongated post 11 of a first (or right) soil guard wall module 10 received in first and second depressions 1012 and 1022 (only the first depression 1012 is shown) of a second (or left) soil guard wall module 10' while the right projection 1014 of the first side wall 101 of the second soil guard wall module 10' abuts against the first end of the elongated post 11 of the first soil guard wall module 10 for retaining the elongated post 11. Since each of the second flange portions 151 is smaller than the associated second side wall 102 in dimension, therefore, a communicating passage 16 is defined between the second flange portions 151 for draining water when the soil guard wall modules are coupled together.

Figure 3:
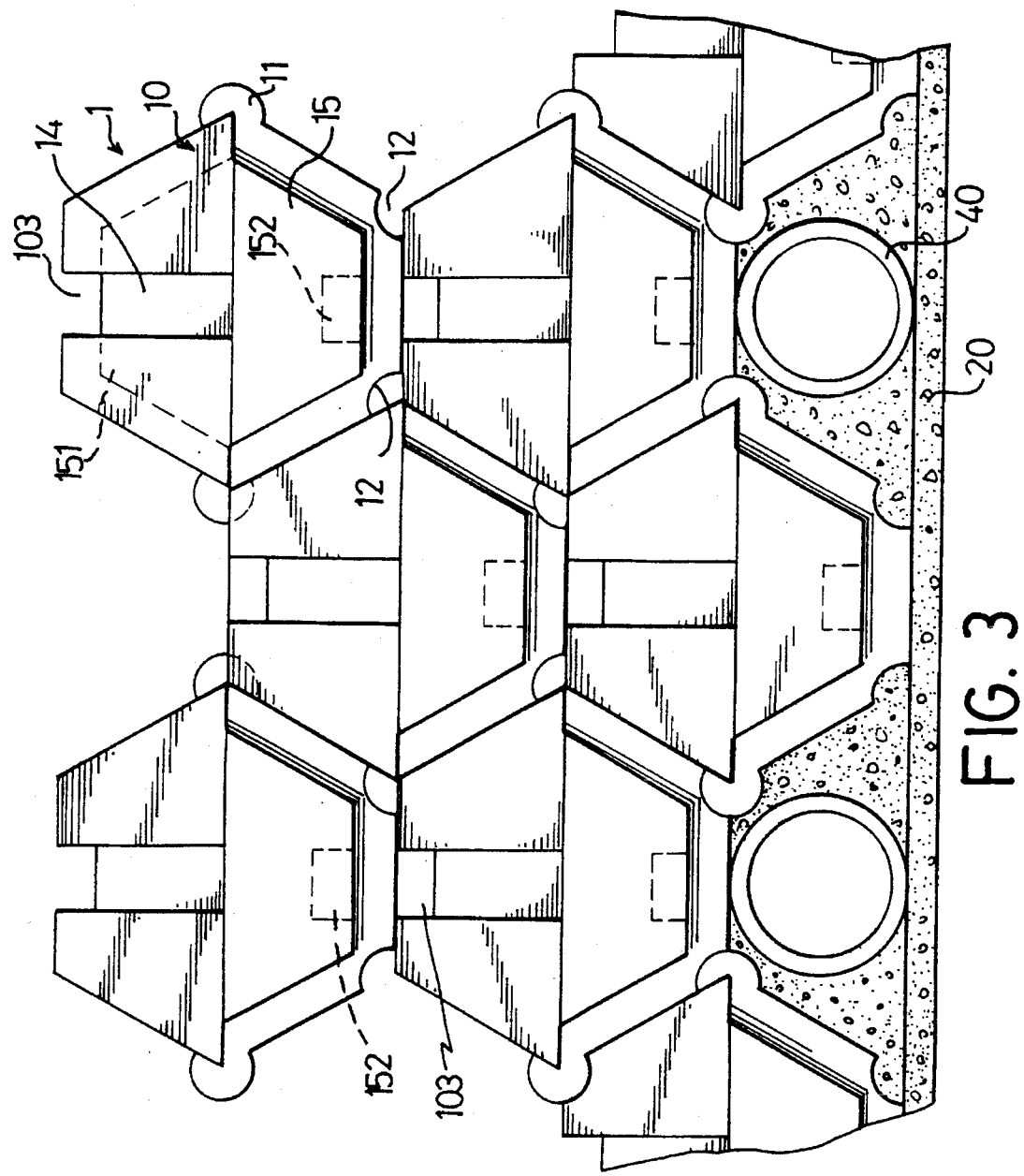
FIG. 3 is a front plan view of a soil guard wall assembly in accordance with the present invention.
Figure 4:
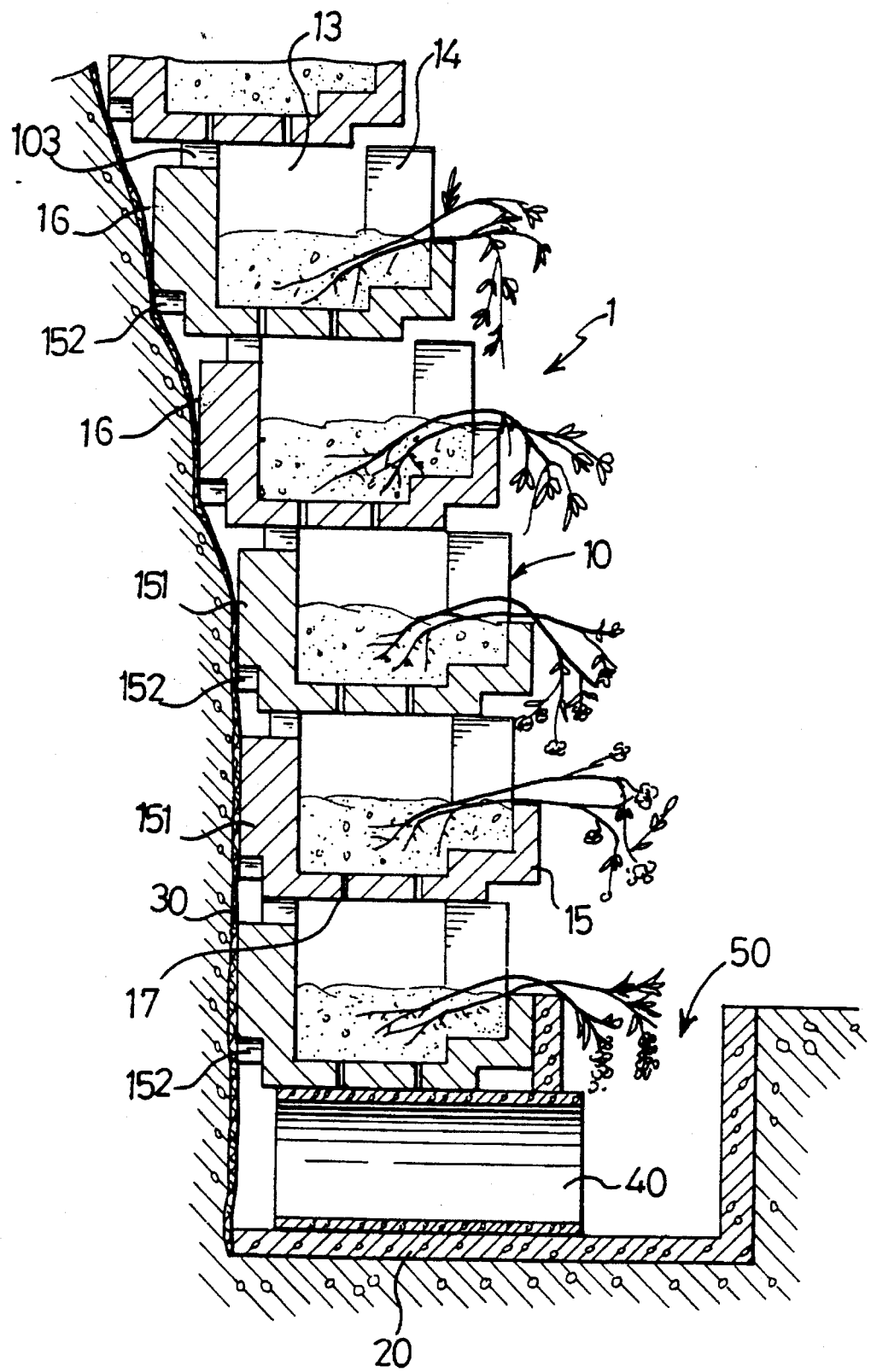
FIG. 4 is a side cross-sectional view of the soil guard wall assembly as shown in FIG. 3.

Referring to FIGS. 3 and 4, a plurality of soil guard wall modules 10 are coupled together so as to form the soil guard wall assembly 1 with a honeycomb configuration. In practice, a fabric 30 is surrounded around an edge portion of a hillside to prevent the soil from infiltrating into and blocking the communicating passage 16 between the plurality of soil guard wall modules 10 of the soil guard wall assembly 1 which is mounted beside the edge portion of the mountain with the plurality of second flange portions 151 thereof abutting against the fabric 30. A draining channel 50 is mounted between a road and the soil guard wall assembly 1 and a draining tube 40 is mounted under the soil guard wall assembly 1 with a concrete structure 20 fitted thereunder. In operation, the water is introduced via the communicating passage 16 defined between the plurality of second flange portions 151 to flow downwardly into the draining tube 40 to be subsequently taken away by the draining channel 50. If the water is too heavy or the communicating passage 16 is partially clogged by soil or sands infiltrating through the fabric 30, the water is able to flow into the concave openings 13 via the plurality of cavities 103 and is then drained outwardly through the plurality of slots 14. In addition, plants may be cultivated in the concave opening 13 of each of the soil guard wall modules 10 With leaves thereof extending outwardly therefrom through the slots 14 so as to afforest and beautify the environment.

Accordingly, a soil guard wall assembly in accordance with the present invention has the following advantages and benefits:

(1) The soil guard wall assembly has a concrete structure and the gravity force exerted on each of the soil guard wall modules is averagely distributed to adjacent soil guard wall modules, thereby stabilizing the whole structure.

(2) Plants can be grown in the soil guard wall modules so as to beautify the environment.

(3) The soil guard wall assembly can provide a great water drainage capability by means of the communicating passage.

It should be clear to those skilled in the art that further embodiments of the present invention may be made without departing from the teachings of the present invention.

What is claimed is:

1. A soil guard wall assembly comprising a plurality of elongated soil guard wall modules (10) each having a hexagonal configuration in section and coupled together with each other to form said soil guard wall assembly (1) with a honeycomb shape, each of said elongated soil guard wall modules (10) including two bottom corner portions and comprising:

two longitudinal grooves (12) each defined in an underside of a corresponding one of said bottom corner portions of said elongated soil guard wall module (10);

two opposite wedged-shaped side portions each having a longitudinal post (11) laterally protruding outwardly therefrom, each of said longitudinal posts (11) including a first end and a second end;

a first side wall (101) of a hexagonal configuration formed on the first ends of said two longitudinal posts (11) and including two top corner portions, two first depressions (1012) each defined in an upperside of a corresponding one of said top corner portions of said first side wall (101), and an elongated slot (14) defined in said first side wall (101) between said two top corner portions thereof;

a second side wall (102) of a hexagonal configuration formed on the second ends of said two longitudinal posts (11) and including two top corner portions, two second depressions (1022) each defined in an upperside of a corresponding one of said top corner portions of said second side wall (102) and each aligning with a corresponding one of said first depressions (1012), and a cavity (103) defined in said second side wall (102) between said two top corner portions thereof; and a concave opening (13) facing upwardly being defined in said elongated soil guard wall module (10) between said first and second side walls (101) and (102) and communicating with said elongated slot (14) and said cavity (103).

2. The soil guard wall assembly in accordance with claim 1, further comprising a first flange portion (15) laterally protruding from said first side wall (101) and a second flange portion (151) laterally protruding from said second side wall (102), a cavity (152) being defined in an underside of said second flange portion (151).

3. The soil guard wall assembly in accordance with claim 1, further comprising a plurality of vertical holes (17) each defined in an underside of said elongated soil guard wall module (10) and each communicating with said concave opening (13).

4. The soil guard wall assembly in accordance with claim 1, wherein said first side wall (101) includes two projections (1014) each formed on a corresponding one of the top corner portions thereof and adjacent to associated said first depression (1012) therein.

\* \* \* \* \*